United States Patent [19]

Ritter

[11] Patent Number: 5,120,080
[45] Date of Patent: Jun. 9, 1992

[54] TRAILER HITCH

[76] Inventor: Merel Ritter, HCR 68, Box 415, Vian, Okla. 74962

[21] Appl. No.: 512,467

[22] Filed: Apr. 23, 1990

[51] Int. Cl.$^5$ .............................................. B62D 53/12
[52] U.S. Cl. .................................... 280/433; 280/434
[58] Field of Search ............... 280/432, 433, 434, 435, 280/436, 437, 508, 509, 510

[56] References Cited

U.S. PATENT DOCUMENTS

| | | | |
|---|---|---|---|
| 2,630,698 | 3/1953 | Morrow | 280/433 X |
| 2,844,390 | 7/1958 | Smith | 280/508 |
| 3,759,545 | 9/1973 | McKethan | 280/434 X |
| 4,227,713 | 10/1980 | Blodett, Jr. et al. | 280/434 |

Primary Examiner—Mitchell J. Hill
Attorney, Agent, or Firm—William S. Dorman; Molly D. McKay

[57] ABSTRACT

A trailer hitch for attaching the forward end of a trailer to the rear end of a vehicle comprising a hitch pin support attachable to the forward end of the trailer and being provided with a downwardly projecting cylindrical hitch pin having a circular metallic disk attached to the lower end thereof, the circular metallic disk having an outer diameter larger than the outer diameter of the hitch pin; a base plate attachable to the rear end of the towing vehicle; a yoke portion having its lower end pivotally connected to the base plate for pivotal movement along a horizontal axis; a yoke plate mounted on the upper end of the yoke portion, the yoke plate having a forward flat portion and a pair of rearwardly and downwardly extending fingers, an elongated horizontal opening being provided between the two fingers and extending part way into the flat portion of the yoke plate where the opening terminates in a semicircle of slightly larger diameter than that of the hitch pin, the rear end of the horizontal opening between the fingers being tapered divergently outwardly; a yoke block slideably mounted in the yoke portion, the yoke block being provided with a U-shaped opening which is slightly larger than the diameter of the hitch pin, a first spring mounted in the yoke portion for urging the yoke block longitudinally rearward; a plunger slideably mounted within the yoke portion, a second spring mounted within the yoke portion for urging the plunger transversely towards the yoke block; the yoke block having a rear portion which is disposed in the path of movement of the plunger by the action of the first spring when the plunger is fully retracted against the action of the second spring; the plunger being adapted to move transversely under the action of the second spring beyond and behind the U-shaped opening in the yoke block when the yoke block is moved forwardly against the action of the first spring to move the rear portion thereof out of the path of movement of the plunger.

4 Claims, 5 Drawing Sheets

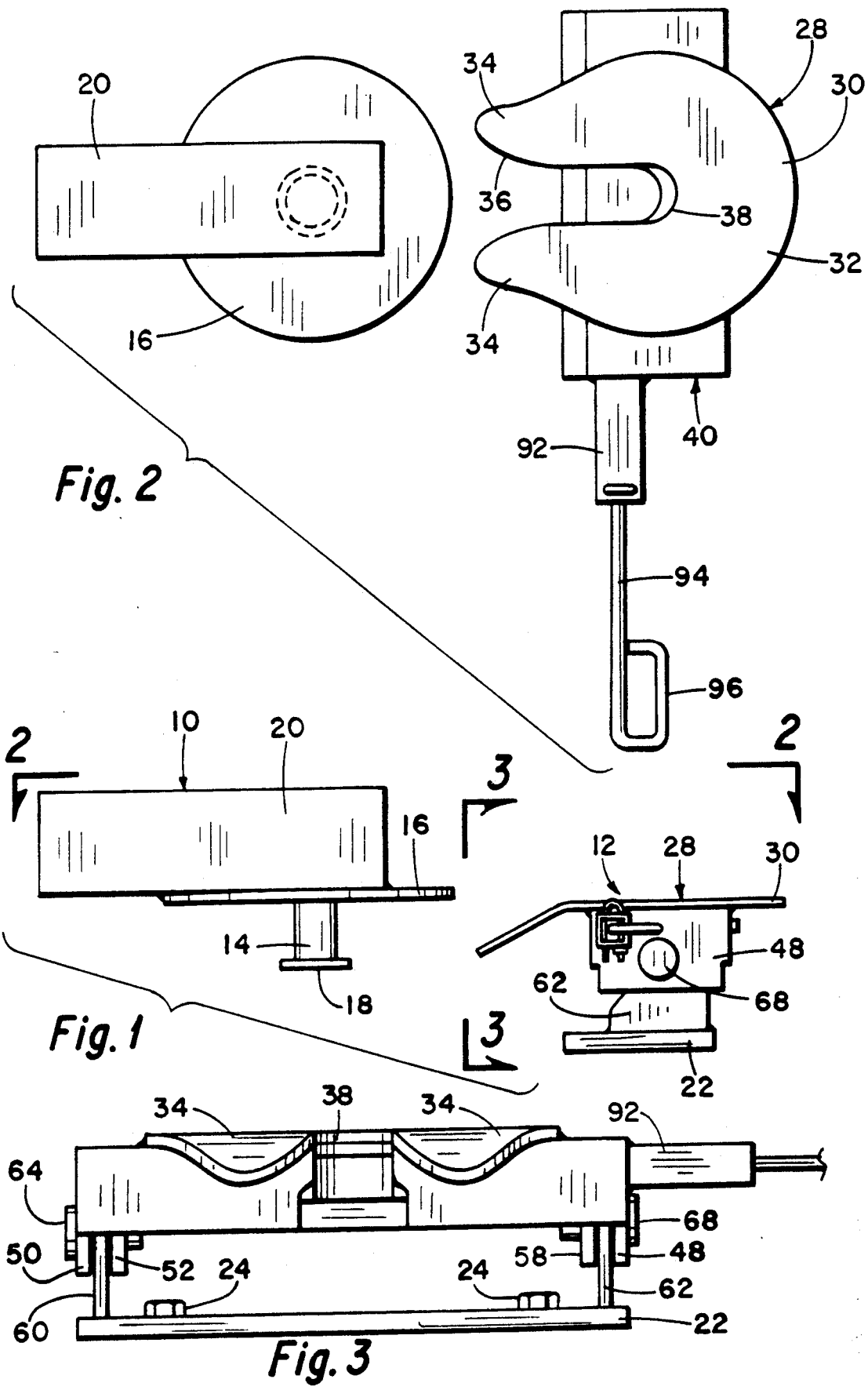

TRAILER HITCH

BACKGROUND OF THE INVENTION

1. Field of the Invention

The present invention relates to a trailer hitch. More particularly, the present invention relates to a trailer hitch of a type sometimes referred to as a "fifth wheel", which will permit simple attachment of a trailer to a truck as well as simple disengagement of the two entities from each other.

2. The Prior Art

There are numerous and different types of trailer hitches on the market today. This inventor is aware of the following listed United States Patents which generally pertain to the subject matter of the present invention:

| | | |
|---|---|---|
| Clarke | 482,546 | September 13, 1892 |
| Londe | 1,592,832 | July 20, 1926 |
| Schmid | 1,595,880 | August 10, 1926 |
| Harris | 1,981,233 | November 20, 1934 |
| Walther | 2,072,661 | March 2, 1937 |
| Hudson | 2,322,446 | June 22, 1943 |
| Durham | 2,977,137 | March 28, 1961 |
| Blodgett | 4,227,713 | October 14, 1930 |

SUMMARY OF THE INVENTION

A trailer hitch is provided for attaching the forward end of a trailer to the rear end of a vehicle which is used to tow the trailer. A hitch pin support is attached to the forward end of the trailer, the hitch pin support being provided with a downwardly projecting cylindrical hitch pin having a circular metallic disk attached to the lower end thereof, the circular metallic disk having an outer diameter larger than the outer diameter of the hitch pin. A base plate is attached to the rear end of the towing vehicle. A yoke portion is provided having an upper end and a lower end, the lower end of the yoke portion being pivotally connected to the base plate for pivotal movement along a horizontal axis. A yoke plate is mounted on the upper end of the yoke portion, the yoke plate having a forward flat portion and a pair of rearwardly and downwardly extending fingers. An elongated horizontal opening is provided between the two fingers and extends part way into the flat portion of the yoke plate, the portion of the horizontal opening extending into the flat portion terminating in a semicircle of slightly larger diameter than that of the hitch pin. The rear end of the horizontal opening between the fingers is tapered divergently outwardly. A yoke block is slideably mounted in the yoke portion, the yoke block being provided with a U-shaped opening which is slightly larger than the diameter of the hitch pin. A first spring is mounted in the yoke portion for urging the yoke block longitudinally rearward. A plunger is slideably mounted within the yoke portion. A second spring is mounted within the yoke portion for urging the plunger transversely towards the yoke block. The yoke block has a rear portion which is disposed in the path of movement of the plunger by the action of the first spring when the plunger is fully retracted against the action of the second spring. Thus, the plunger is adapted to move transversely under the action of the second spring beyond and behind the U-shaped opening in the yoke block when the yoke block is moved forwardly against the action of the first spring to move the rear portion thereof out of the path of movement of the plunger. Therefore, when the plunger is in the fully retracted position against the action of the second spring, with the rear portion of the yoke block being disposed in the path of movement of the plunger under the action of the first spring, the towing vehicle can be moved relatively rearwardly towards the trailer until the hitch pin passes into the elongated horizontal opening between the two fingers. Furthermore, upon further relative rearward movement of the towing vehicle towards the trailer, the hitch pin will pass into the U-shaped opening in the yoke block to move the yoke block forwardly against the action of the first spring, after which the plunger will be released to move transversely beyond and behind the U-shaped opening and behind the hitch pin such that the hitch pin is now located in the U-shaped opening.

BRIEF DESCRIPTION OF THE DRAWINGS

FIG. 1 is a side elevation of the major components of the present invention;

FIG. 2 is a plan view looking along line 2—2 of FIG. 1;

FIG. 3 is a rear elevation of one of the major components of the present invention looking along line 3—3 of FIG. 1;

DETAILED DESCRIPTION OF THE PREFERRED EMBODIMENTS

Figure 4:
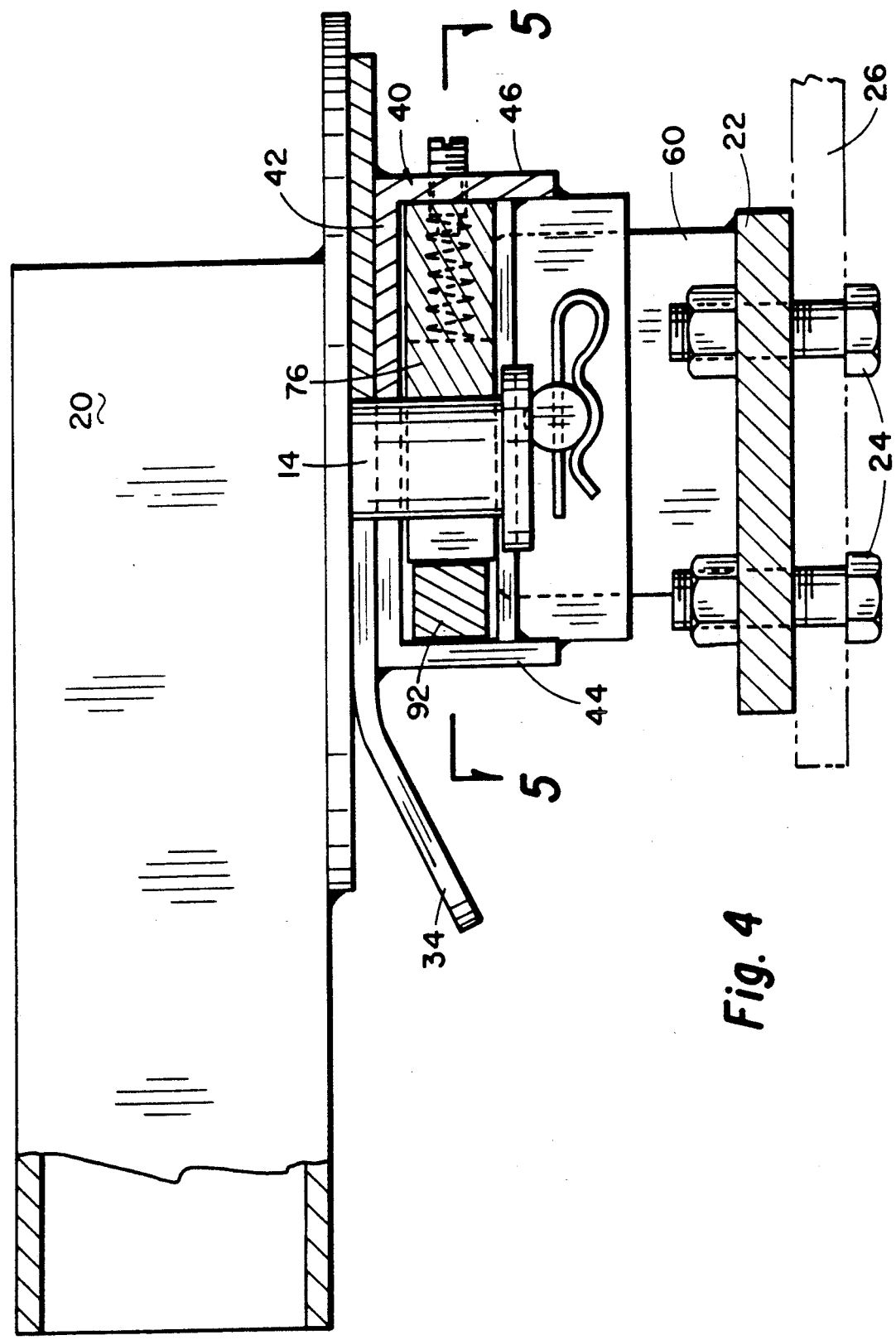
FIG. 4 is a side elevation, similar to FIG. 1 but on an enlarged scale, showing some parts broken away and other parts in section, and representing the locked position of the two major components.

Referring to the drawings in detail, FIG. 1 shows a hitch pin section 10 and a hitch section 12.

The hitch pin section 10 includes a hitch pin 14 which is welded at its upper end to a circular metal disc or plate 16 and which is welded at its lower end to a smaller circular metallic disc 18. The circular plate 16 is welded to the lower forward end of a rectangular member 20 which constitutes the forward end of a trailer tongue for a vehicle or trailer which is to be towed.

The hitch section 12 comprises a base plate 22 which can be fixed to a portion 26 of the rear bumper (not otherwise shown) of a towing vehicle (not shown) by means of bolts 24.

The hitch section 12 also includes a yoke portion 28 which is pivotally connected to the base plate 22 in a manner later to be described. The yoke portion includes a yoke plate 30 having a forward circular portion 32 and a pair of rearwardly and downwardly extending fingers 34. A elongated horizontal opening 36 is provided between the two fingers 34. The right hand or forward end 38 of the opening 36 constitutes a semi-circle of slightly larger diameter than the central or main diameter of the hitch pin 14. The rear or left hand end (as it appears in FIG. 2) is tapered divergently outwardly to provide a centering action when the towing vehicle (not shown) which supports the hitch portion 12 is backed into the hitch pin section 10.

The yoke plate 28 is welded to the upper surface of a rectangular suport 40 which includes a top horizontal plate 42, side vertical plates 44 and 46, and end vertical plates 48 and 50. The rectangular support 40 also includes intermediate vertical plates 52, 54, 56 and 58, all of which are parallel to the side plates 48 and 50.

Figure 5:
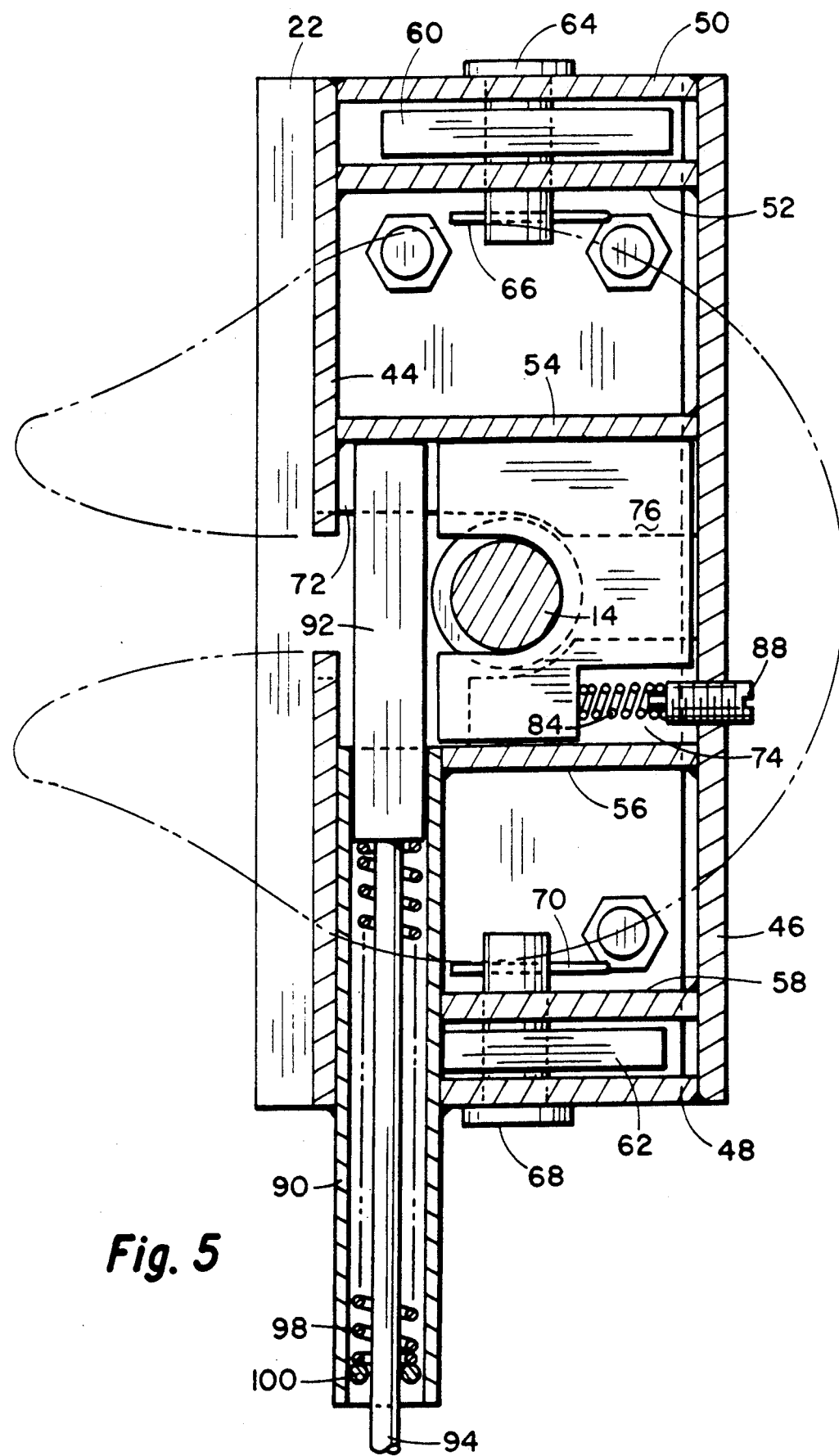
FIG. 5 is a sectional view taken along section line 5—5 of FIG. 4.
Figure 6:
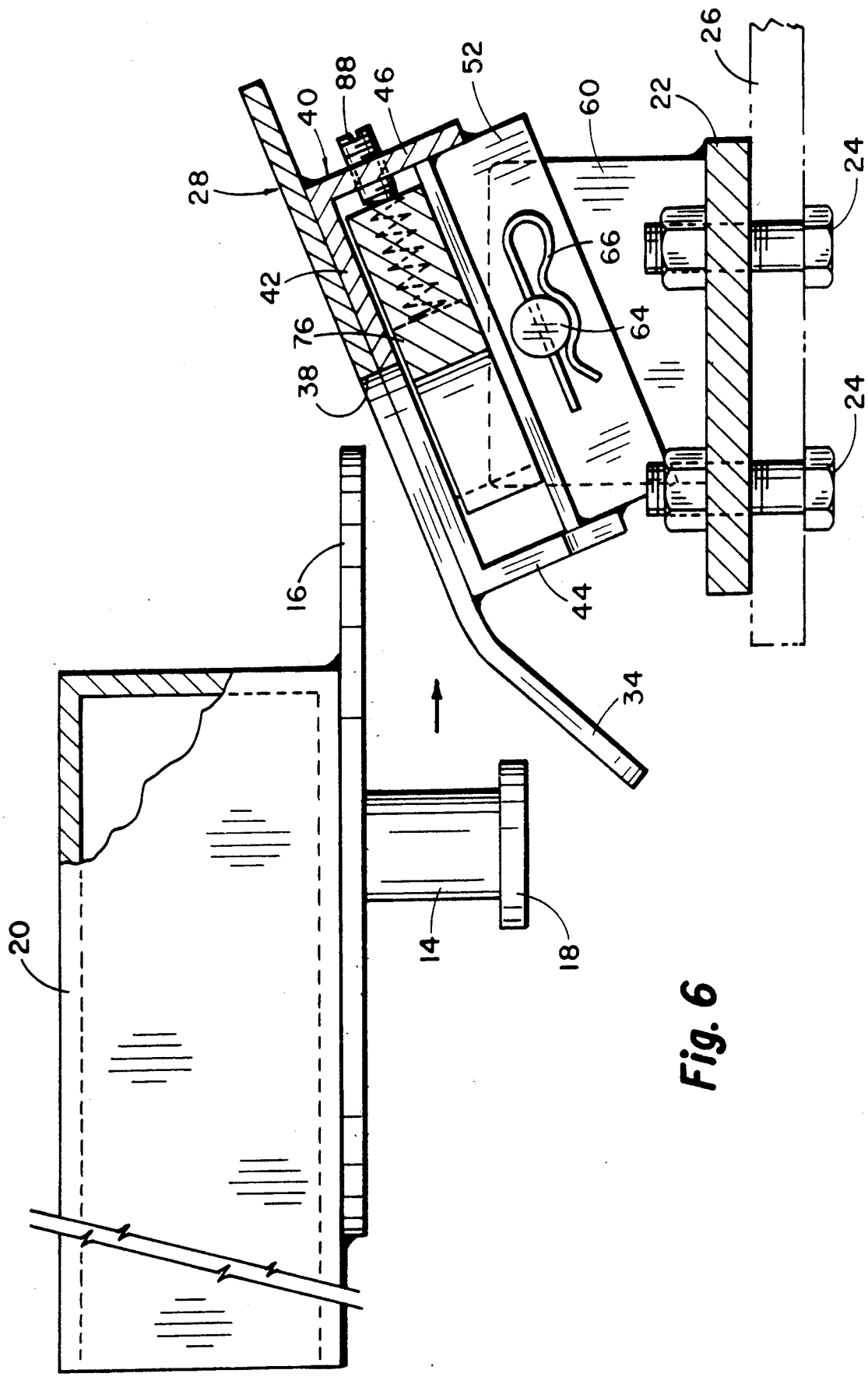
FIG. 6 is a side elevation similar to FIG. 4 showing the major components in a separated condition with one of the parts in cocked position ready to receive the other component, with certain parts broken away and other parts in section.
Figure 7:
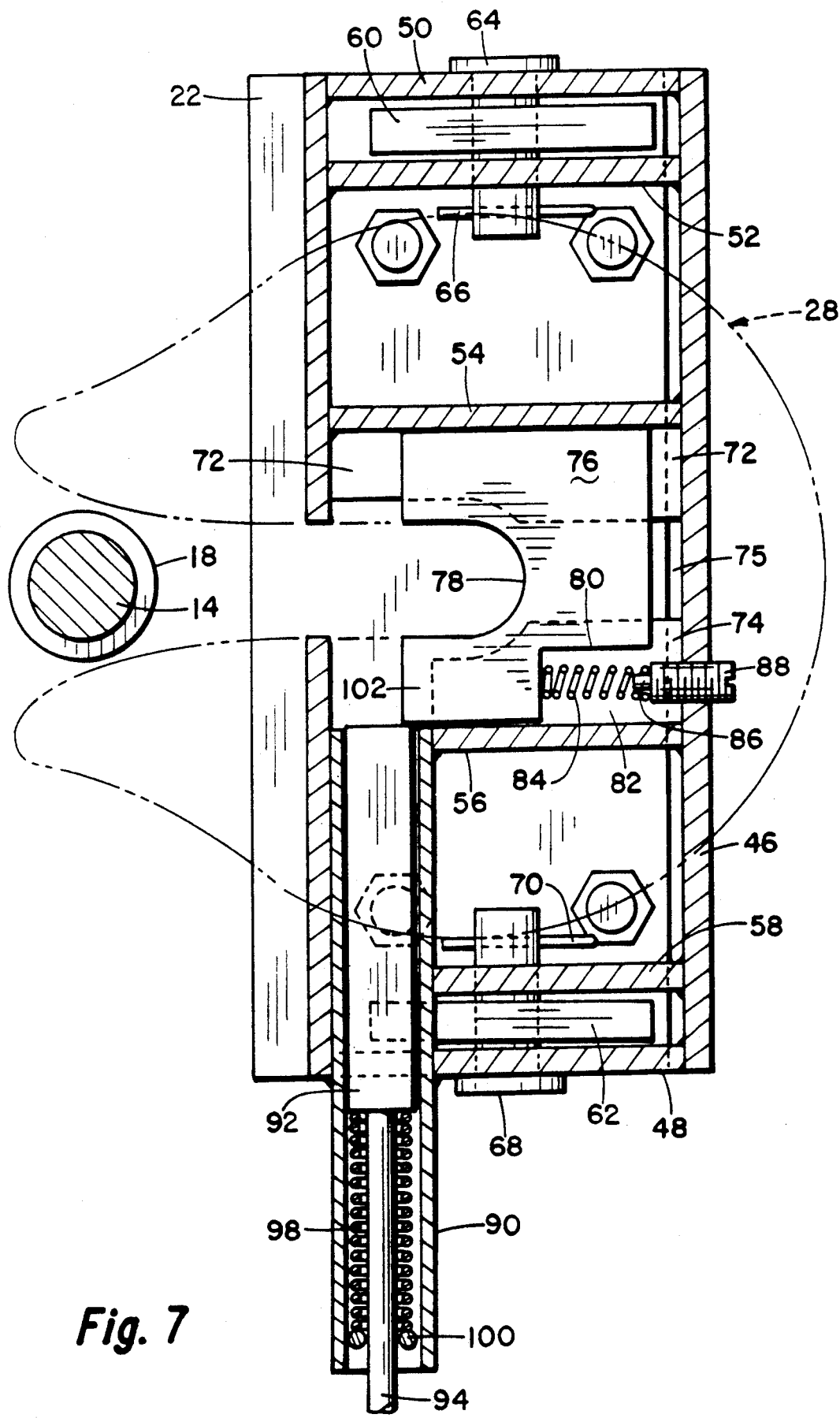
FIG. 7 is a view similar to FIG. 5 showing the parts in separated condition and with one of the parts in cocked position.

The base plate 22 is provided with a pair of vertical side plates 60 and 62 which are welded to the base plate 22 adjacent the ends thereof. As best shown in FIGS. 5 and 7, the side member 60 of the base plate 22 projects upwardly into the space between side plates 50 and 52 of the rectangular support 40. Similarly, the side member 62 of the base plate 22 projects upwardly into the space between the side plates 48 and 58 of the rectangular support 40. The side plates 50 and 52 are provided with aligned holes (not shown) and the side member 60 on the base plate 22 is provided with a hole which is in alignment with the aforementioned holes in the members 50 and 52 when the parts are in the relative positions shown in FIG. 3. A clevis pin 64 is adapted to pass through the aligned holes in members 50, 52 and 60 and a cotter pin 66 is secured on the inner end of the clevis 64 to hold the latter in place. The clevis pin 68 is adapted to pass through aligned holes in the members 48, 58 and 62 and the inner end of this clevis 68 is secured by means of a cotter pin 70.

The intermediate vertical plates 54 and 56 on the rectangular support 40 do not extend downwardly to the same extent as the plates 48, 50, 52 and 58. Horizontal plates 72 and 74 and welded to the lower ends of the vertical plates 54 and 56, respectively, and extended toward each other by providing a space 75 between these two horizontal plates as best shown in FIG. 7. The plates 54, 56, 72 and 74 form a rectangular cavity in which a generally rectangular yoke block 76 is adapted to slide. The yoke block 76 is provided with a U-shaped opening 78 which is slightly larger than the diameter of the hitch pin 14. The yoke block 76 is also provided with a rectangular notch 80 which forms a smaller rectangular recess 82 with the side 56. A spring 84 is positioned in the recess 82 such that its rear end bears against the rear end of the notch 80. The forward end of the spring 82 is received over a pin 86 formed on the rear end of a threaded screw 88. The screw 88 is received in a suitable threaded hole in the forward vertical side plate 46 of the rectangular support 40. The screw 88 can be turned to adjust the spring pressure against the yoke plate 76.

A hollow rectangular tube 90 passes through an appropriate opening in the side plate 48 and extends inwardly such that its inner end is in alignment with the inner surface of the plate 56. A rectangular plunger 92 is slideably mounted within the tube 90 and a rod 94 is attached to the plunger 92. A handle 96 is mounted at the outer end of the rod 94 so as to permit movement of the plunger 92 to the cocked position shown in FIG. 7. A coiled spring 98 is received on the rod 94 within the tube 90. One end of the spring 98 bears against the plunger 92 and the other end of the spring bears against a retainer 100 which is secured adjacent the outer end of the tube 90.

Referring now to FIG. 7, when the rod 94 is pulled outwardly (by pulling on the handle 96 shown in FIG. 2) the spring 98 will be compressed; when the inner end of the plunger 92 is in alignment with the inner surface of the vertical plate 56, the spring 84 will push the yoke block 76 rearwardly such that the corner 102 will project over the passageway of the tube 90. As the pulling force on the rod 94 is now removed, the inner end of the plunger 92 will be retained in the position shown in FIG. 7 by the projecting corner 102 of the yoke block 76.

OPERATION

Assuming that the trailer hitch is in the cocked position shown in FIG. 7 and that the hitch pin section 10 is properly mounted on the tongue 20 of a trailer (not shown) if the towing vehicle (not shown) to which the hitch section 12 is attached is backed towards the hitch pin portion 10, the hitch pin 14 will pass into the opening 36 between the fingers 34. The bottom of the plate 16 will contact the upper portion of the yoke plate 28. Continued backing of the towing vehicle will cause the hitch pin to contact the U-shaped opening 78 in the yoke block 76. The latter will move in a forward direction against the action of the spring 84 and the corner 102 of the yoke block 76 will also move forwardly to allow the plunger 92 to move behind the hitch pin 14 to assume the locked position shown in FIG. 5. The trailer (not shown) is now in a condition to be towed by the towing vehicle (not shown). The plunger 92 is sufficiently large and rugged that it will not be bent or damaged by contact with the hitch pin 14 when the towing vehicle commences to tow the trailer. In similar fashion, the housing 40 is constructed of rugged parts which will be capable of sustaining the forces that will be normally imposed upon them by the towing action.

What is claimed is:

1. A trailer hitch for attaching a forward end of a trailer to a rear end of a towing vehicle which is used to tow the trailer comprising a downwardly projecting cylindrical hitch pin attached to the trailer, an enlargement at a lower end of the hitch pin; a base plate attachable to the rear end of the towing vehicle; a yoke portion having an upper end and a lower end, the lower end of the yoke portion being pivotally connected to the base plate for pivotal movement along a horizontal axis; a yoke plate mounted on the upper end of the yoke portion, the yoke plate having a forward flat portion and two of rearwardly extending fingers, an elongated horizontal opening being provided between the two fingers and extending part way into the flat portion of the yoke plate, the portion of the horizontal opening extending into the flat portion terminating in a semicircle of slightly larger diameter than that of the hitch pin, the rear end of the horizontal opening between the fingers being tapered divergently outwardly; a yoke block slideably mounted in the yoke portion, the yoke block being provided with a U-shaped opening which is slightly larger than the diameter of the hitch pin, a first spring mounted in the yoke portion for urging the yoke block longitudinally rearward; a plunger slideably mounted within the yoke portion, a second spring mounted within the yoke portion for urging the plunger transversely towards the yoke block; the yoke block having a rear portion which is disposed in the path of movement of the plunger by the action of the first spring when the plunger is fully retracted against the action of the second spring; the plunger being adapted to move transversely under the action of the second spring beyond and behind the U-shaped opening in the yoke block when the yoke block is moved forwardly against the action of the first spring to move the rear portion thereof out of the path of movement of the plunger; whereby when the plunger is in the fully retracted position against the action of the second spring with the rear portion of the yoke block being disposed in the path of movement of the plunger under the action of the first spring, the towing vehicle can be moved relatively rearwardly towards the trailer until the hitch pin passes into the elongated horizontal opening between the two fingers and, whereby, upon further relative rearward movement of the towing vehicle towards the trailer, the hitch pin will pass into the U-shaped opening in the yoke block to move the yoke block forwardly against the action of the first spring, after which the plunger will be released to move transversely beyond and behind the U-shaped opening and behind the hitch pin which is now located in the U-shaped opening.

2. A trailer hitch as set forth in claim 1 including a hitch pin support attachable to the forward end of the trailer, the hitch pin projecting downwardly from the hitch pin support.

3. Claim 3 is set forth in claim 1 wherein the enlargement at the lower end of the hitch pin consists of a circular metallic disc having an outer diameter larger than the outer diameter of the hitch pin.

4. A trailer hitch as set forth in claim 1 wherein the fingers which extend rearwardly from the yoke plate also extend downwardly.

* * * * *